(12) United States Patent
Maggio (10) Patent No.: US 11,853,924 B2
(45) Date of Patent: *Dec. 26, 2023

(54) SYSTEMS AND METHODS FOR IMPLEMENTING USER-RESPONSIVE REACTIVE ADVERTISING VIA VOICE INTERACTIVE INPUT/OUTPUT DEVICES

(71) Applicant: Frank S. Maggio, Seminole, FL (US)

(72) Inventor: Frank S. Maggio, Seminole, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/084,522

(22) Filed: Dec. 19, 2022

(65) Prior Publication Data

US 2023/0119929 A1 Apr. 20, 2023

Related U.S. Application Data (63) Continuation of application No. 16/543,490, filed on Aug. 16, 2019, now Pat. No. 11,532,007.
(Continued)

(51) Int. Cl.
*G06Q 30/02* (2023.01)
*G06Q 30/0217* (2023.01)
(Continued)

(52) U.S. Cl.
CPC ..... *G06Q 30/0218* (2013.01); *G06Q 30/0239* (2013.01); *G06Q 30/0245* (2013.01)

(58) Field of Classification Search
None
See application file for complete search history.

(56) References Cited

U.S. PATENT DOCUMENTS

| 6,934,684 | B2 | 8/2005 | Alpdemir et al. |
| 8,924,880 | B2 | 12/2014 | Altberg et al. |

(Continued)

FOREIGN PATENT DOCUMENTS

| WO | 2005091717 A2 | 10/2005 |
| WO | 2005119648 A2 | 12/2005 |

OTHER PUBLICATIONS

Dynamic insertion of related media content based on active group conversations; Sep. 18, 2009; IP.com No. IPCOM000187930D.*
(Continued)

*Primary Examiner* — David J Stoltenberg
(74) *Attorney, Agent, or Firm* — TannerIP PLLC; Daniel A. Tanner, III; James E. Golladay, II (57) ABSTRACT

A system and method are provided for employing voice-activated user interfaces to determine user attention to particularly-presented advertising content by collecting user contact/consumer information, presenting content to the user/consumer, and proposing at least one question, inquiry or query to the user regarding the presented content, the at least one inquiry or query calling for a user/consumer response to be collected, at least one of (a) the user/consumer contact information and (b) the user/consumer response to the question, inquiry or query being collected by the system via a voice-activated user interface and evaluated to assess a level of engagement of the user/consumer with the advertising content. The disclosed systems and methods uniquely provide voice-activated user interface coupled with display of certain advertising content in a manner that promotes user/consumer attention to the advertising content and ease of interaction with the presentation system.

1 Claim, 2 Drawing Sheets

Related U.S. Application Data (60) Provisional application No. 62/764,772, filed on Aug. 16, 2018.

(51) Int. Cl.
  G06Q 30/0207 (2023.01)
  G06Q 30/0242 (2023.01)

(56) References Cited

U.S. PATENT DOCUMENTS

| | | | |
|---|---|---|---|
| 9,002,712 | B2 | 4/2015 | Alpdemir et al. |
| 9,037,708 | B2 | 5/2015 | Schultz et al. |
| 9,117,374 | B2 | 8/2015 | Nguyen |
| 9,484,046 | B2 | 11/2016 | Knudson et al. |
| 9,552,589 | B2 | 1/2017 | Gurumoorthy et al. |
| 9,639,854 | B2 | 5/2017 | Balasubramanian et al. |
| 9,807,442 | B2 | 10/2017 | Bhatia et al. |
| 10,120,547 | B2 | 11/2018 | Adarraga |
| 10,268,772 | B2 | 4/2019 | Deopura |
| 10,360,265 | B1 | 7/2019 | Agarwal |
| 10,405,045 | B2 | 9/2019 | Oren et al. |
| 10,446,145 | B2 | 10/2019 | Kim et al. |
| 10,522,146 | B1 | 12/2019 | Tushinskiy |
| 10,530,924 | B1 | 1/2020 | Leeds et al. |
| 10,546,326 | B2 | 1/2020 | Publicover et al. |
| 10,614,487 | B1 | 4/2020 | Tushinskiy |
| 10,714,081 | B1 | 7/2020 | Miller et al. |
| 10,764,646 | B2 | 9/2020 | Chand et al. |
| 10,831,345 | B2 | 11/2020 | Bufe, III et al. |
| 10,853,826 | B2 | 12/2020 | Romagnolo et al. |
| 10,904,611 | B2 | 1/2021 | Van Os et al. |
| 10,956,006 | B2 | 3/2021 | Napolitano et al. |
| 11,159,585 | B2 | 10/2021 | Zavesky et al. |
| 11,182,747 | B2 | 11/2021 | Steinhoff et al. |
| 11,227,291 | B2 | 1/2022 | Luff |
| 11,465,029 | B2 | 10/2022 | Wanke et al. |
| 2002/0035474 | A1 | 3/2002 | Alpdemir |
| 2002/0116256 | A1 | 8/2002 | De Rafael et al. |
| 2002/0174436 | A1 | 11/2002 | Wu et al. |
| 2004/0103032 | A1 | 5/2004 | Maggio |
| 2004/0143493 | A1* | 7/2004 | Gessner ............ G06Q 30/0217 |
| | | | 705/14.19 |
| 2005/0136949 | A1 | 6/2005 | Barnes, Jr. |
| 2006/0041478 | A1 | 2/2006 | Zheng |
| 2006/0129458 | A1 | 6/2006 | Maggio |
| 2006/0253330 | A1 | 11/2006 | Maggio et al. |
| 2006/0282319 | A1 | 12/2006 | Maggio |
| 2010/0016000 | A1 | 1/2010 | Little et al. |
| 2010/0138852 | A1 | 6/2010 | Hirsch et al. |
| 2011/0106593 | A1 | 5/2011 | Schoenberg |
| 2011/0276882 | A1 | 11/2011 | Buehler et al. |
| 2013/0073392 | A1 | 3/2013 | Allen et al. |
| 2013/0096966 | A1 | 4/2013 | Barnes, Jr. |
| 2013/0325627 | A1 | 12/2013 | Kimmerling |
| 2013/0337891 | A1 | 12/2013 | Pogostin et al. |
| 2014/0154983 | A1* | 6/2014 | Schultz ............... H04B 5/0031 |
| | | | 455/41.1 |
| 2014/0163706 | A1 | 6/2014 | Wilen |
| 2014/0298364 | A1* | 10/2014 | Stepanov .......... H04N 21/4668 |
| | | | 725/10 |
| 2015/0178754 | A1 | 6/2015 | Liu et al. |
| 2015/0193804 | A1 | 7/2015 | Liu et al. |
| 2015/0379568 | A1* | 12/2015 | Balasubramanian ...................... |
| | | | G06Q 30/0261 |
| | | | 705/14.53 |
| 2016/0005322 | A1 | 1/2016 | Xavier |
| 2017/0147576 | A1* | 5/2017 | Des Jardins ........ G06F 16/7844 |
| 2017/0171620 | A1* | 6/2017 | Oren ................ H04N 21/44226 |
| 2018/0007150 | A1* | 1/2018 | Deopura ............... H04W 4/23 |
| 2018/0032997 | A1 | 2/2018 | Gordon et al. |
| 2018/0213290 | A1 | 7/2018 | Roman et al. |
| 2018/0308116 | A1 | 10/2018 | Maggio |
| 2018/0308473 | A1 | 10/2018 | Scholar |
| 2018/0349480 | A1* | 12/2018 | Carlisle ................ G06F 16/958 |
| 2020/0184501 | A1 | 6/2020 | Maggio |
| 2020/0221190 | A1 | 7/2020 | Bhattacharjee |

OTHER PUBLICATIONS

Speech and Language Processing over the Web, Changing the way people communicate and access information; IEEE Signal Processing Magazine May 18, 2008 1053-5888/08.*

Event Mining in Multimedia Streams, Xie et al., vol. 0018-9219/ $25.00 2008 IEEE 96, No. 4, Apr. 2008 | Proceedings of the IEEE.

The Design and Development of User Interfaces for Voice Application in Mobile Devices, Lee et al., 0-7803-9778-9/06 C2006 IEEE.

An Empirical Study on Voice-Enabled Web Applications, Chang et al., Pervasive computing Published by the IEEE CS and IEEE ComSoc.

A Methodological Approach to User Evaluation and Assessment of a Virtual Environment Hangout; Pasin et al., 2015 7th International Conference on Intelligent Technologies for Interactive Entertainment.

* cited by examiner

SYSTEMS AND METHODS FOR IMPLEMENTING USER-RESPONSIVE REACTIVE ADVERTISING VIA VOICE INTERACTIVE INPUT/OUTPUT DEVICES

BACKGROUND

This application is a continuation of U.S. patent application Ser. No. 16/543,490, entitled "Systems and Methods for Implementing User-Responsive Reactive Advertising Via Voice Interactive Input/Output Devices," filed on Aug. 16, 2019, which in turn claims the benefit on U.S. Provisional Patent Application No. 62/764,772, entitled "Systems and Methods for Implementing User-Responsive Reactive Advertising via Voice Interactive Input/Output Devices," filed on Aug. 16, 2018, the disclosures of which are hereby incorporated by reference herein in their entirety.

1. Field of the Disclosed Embodiments

This disclosure is directed to original systems, schemes, devices and methods for employing voice-activated user interfaces to determine user attention to particularly-presented content by collecting user contact/consumer information, presenting content to the user, and proposing at least one inquiry or query to the user regarding the presented content, the at least one inquiry or query calling for a user response to be collected, at least one of (a) the user contact/consumer information and (b) the user response to the inquiry or query being collected by the system via a voice-activated user interface.

2. Related Art

Globally, mass media advertising has evolved into a more than one trillion-dollar annual industry. Through advertising across a widening variety of digital and media platforms, individual brand purveyors, supported by all manner of advertising agencies, attempt to convey information to consumers in a manner that creates interest in the advertised branded products and/or services. The individual brand purveyors and advertising agencies attempt to capture consumer attention ideally in a powerful, captivating and repeated manner that is enough to drive the consumers to purchase and repurchase specifically advertised products and services.

Electronic mass media advertising has coincidently evolved. Long gone are the nascent days when radio was introduced and became the then the sole broad audience electronic media delivery medium. Radio advertising, although not completely gone, was certainly eclipsed with the emergence and expansion of commercial television as the currently-conventional and "preferred" medium to reach the masses for entertainment, and therefore advertising, content delivery to the broad audience. The evolution continues even as television begins to stubbornly give way to the realities of the typical multiple display screen activities undertaken by an expanding percentage of the consuming public. Over the last three generations, from radio, through television, to multi-screen Internet supported media exchange capabilities, advertising-supported media, in increasingly varying forms has proliferated, and the amount and/or frequency of advertising, driven by the need to expose the consuming public to repetitive content across multiple screens, has multiplied as the media and data exchange mediums have changed. Three network news and entertainment stations have evolved into dozens and dozens of news and entertainment and sports and advertising and other channels only in broadcast and cable news content, even as a new generation of consumers is not tied to the big-box (or screen) in the family room.

Today, there is an expanding trend toward reaching the consuming public via delivery of all versions of advertising-supported media to the individual users'/consumers' personal electronic devices, including desktop, portable and/or tablet computers, mobile cellular telephones, smart phones, and all manner of, for example, fixed-location changeable electronic displays. Consumers, particularly those that carry one or more portable personal electronic devices, which now may include wearable input/output (I/O) devices, have become increasingly drawn to actively using these portable personal electronic devices, even in environments once primarily used for passively watching television. Consumer portable personal electronic devices accompany the users at almost all times, providing those users with the ability, and the increasingly insatiable opportunity, to multi-task in their acquisition and sharing of information in a real-time user-involved information exchange experiences.

These real-time user-involved information exchange experiences include virtually all manner of electronically-enabled communication activities, including, but not limited to, engagement with social media, electronic gaming (including group participation) for active entertainment experiences, selection of particular media content for passive entertainment experiences, and information exchange through email, messaging applications, and other forms of user-to-user (or user-to-a collective of users) communication.

Engagement, via the individual users' personal electronic devices, continues, and often dominates, even as the users are exposed to advertising content presented on that television in the family room, bedroom, office, bar, or other location either private or public. Consumers have developed a near twitch-like response to multi-task, or "otherwise" engage, when advertising, which is often considered disruptive, interrupts them, like an uninvited guest. To any extent that the user cannot simply click-through the presentation of disruptive advertising content on one or more of the users platforms, the user will more often take the opportunity of not needing to payee to the advertising content to address other "more important" digital inputs. Conventional commercial time, therefore, presents the user with the opportunity to check her or his messages, briefly review news content, or pickup and interrupted game on her or his other mobile devices.

A further emerging trend is now toward increasing user/consumer ease of interaction by removing the need for the user to type information into any one or more of her or his electronic devices. Voice interactive programs and I/O devices are provided to allow the individual user to simply speak to the user's devices and have the user's inputs more quickly assimilated into the increasingly sophisticated increasingly sophisticated voice interactive input output programs. Voice command devices (VCD) are controlled by means of the human voice, removing the need to use buttons, dials and switches, and/or the dreaded keyboard. Users/consumers easily operate, not only their electronic devices, but all manner of appliances through vocal commands with voice-activated prompting. Originally trained to interact with the voice of a single user/consumer, newer VCDs are speaker-independent, so they can respond to multiple voices, regardless of accent and/or dialectal influences. These VCDs are generally capable of responding to several commands at once, separating vocal messages, and providing appropriate feedback, often now having evolved to imitating a natural conversation.

Originally "programmed" to respond to only a select menu of specified commands, the capabilities have now expanded to provide for interactive challenge and reply interaction in which the receiving system can "understand" myriad commands and retain minutes of vocal messages to be deconstructed and "understood" immediately, or at a particular time when a device or system user chooses to "retrieve" the user's messages, commands, directions, and the like.

VCDs can be found in: (1) computer operating systems and commercial software for computers (Apple® Siri and Microsoft® Cortana, for example); (2) mobile phones (both Apple® and Android® operating systems; (3) vehicles (Ford® Sync, Lexus® Voice Command, Chrysler® Uconnect, and General Motors® IntelliLink, to name a few; (4) Internet search engines, such as Google® with its "Home" family of products; and (5) Internet marketplaces such as Amazon®, with its "Alexa" service. And this represents only the tip of the proverbial iceberg with regard to systems being provided to facilitate voice interaction across an increasingly broad spectrum of devices.

These systems greatly advance the Interactive Voice Response (IVR) technology systems that have been around for decades. Many users/consumers have found themselves frustrated in interacting with, for example, telephone voice prompts that request rudimentary responses that are all-too-often misunderstood. Conceptually, IVR allowed a computer to interact with a human user through the use of voice and standard tones input via a keypad. In communication systems, IVR allowed customers to interact with a company's host system via a telephone keypad or by speech recognition, after which services could be requested through the IVR dialogue. IVR systems would typically respond with pre-recorded or dynamically generated audio to further direct users regarding next steps in how to proceed. IVR systems have been used for mobile purchases, banking payments and services, retail orders, utilities, travel information and weather conditions.

These advancing technologies, while intended to ease the burden on the user/consumer, are include a number of inherent features that nay be considered drawbacks from the perspective of the content provider or advertiser. First, they can serve to keep the perception of the individual user off the content provided on the display components of the personal electronic devices as the user/consumer just "talks at" the microphone with momentary glances at the display to ensure that proper fields are being populated. Second, they can provide distractive sensory overload to a particular user/consumer as that individual attempts to process all of the data coming and going at a faster speed than would be the case if pausing to concentrate and type the responses. While providing the ability for users/consumers to do more, faster, more often and at more locations, voice interactive user/consumer personal electronic and/or portable "smart" devices, and their inherently distractive nature, may contribute to even more severely diminished advertising efficacy, for example, particularly with regard to advertising content delivered via traditional passive delivery channels.

As can be surmised from the above discussion, advertising content is often discounted as just one more distraction in a sea of distractions or as being "just there," and is often ignored as the attention of the user/consumer is directed to other forms of "more important" personal interactive information exchange, and/or to other attention-grabbing information as is "directed" based on the selections presented by the voice interactive device. It is thus harder to gain, and maintain, user/consumer attention to advertising, even during "live" programs, while sound bites of interaction stream to and from the user's/consumer's voice interactive device. Engagement with the personal electronic devices, including smart phones, and with content-related applications, particularly through voice interactive engagement, deters or detracts/distracts from engagement with particular brands, and with the advertising content that is so carefully formulated to encourage attention and engagement.

For all of these reasons, greatly diminished is the efficacy of the traditional advertising model, in which media, including conventional television networks, radio stations, newspapers and magazines, developed entertainment content of interest to users/consumers which served as the backdrop for the inclusion of the advertising content in a business model by which advertising dollars were typically apportioned according to an estimate of the number of households (read consumers) the advertising was intended to reach. The advertising agencies developed demographic profiles regarding who was viewing what and when and formulated targeted "ad buys" to reach the "correct" audience at the correct time, with the correct presentation. The audience for the entertainment content was monitored and analyzed to demographically determine the interest of the users/consumers in order to target the audience in a manner that was intended to maximize the efficiency and the effectiveness of displayed advertising content presented at breaks in the entertainment content. Advertising costs were predicated on the size and demographic of the audience. The model, however, presumed a certain level of attention to the advertising content. That presumed level of attention is what has diminished as the ease of distraction for the user/consumer has so greatly increased.

Objectives of the advertisers, supporting the specific brand purveyors, remain to provide the users/consumers with advertising content that includes information on the advertisers' product or service in a manner that the increasingly distracted user/consumer will recall rather than typically ignoring and/or avoiding. The challenge is not only the medium, but the mechanism by which the advertising content is presented, and the need to update the conventional measuring schemes to determine whether, in fact, the advertising content is not only reaching the selected audience, but is also being absorbed by that audience in a meaningful manner.

SUMMARY

It may be advantageous, in view of the above distractive nature generally imputed to one's portable personal electronic devices, to find some manner by which to harness that distraction such that advertising content may be delivered in a measurable manner through a cooperative combination of passive content delivery channels and user/consumer interactive portable personal electronic devices, and particularly those that employ user/consumer voice interactive I/O devices.

It may be advantageous to provide one or more schemes that would advance the advertisers' objectives by presenting advertising content in the same user/consumer interactive format that the user/consumer receives substantially all other information across the medium, and/or devices, most often employed by the user/consumer. With such presentation, a user/consumer may be engaged in a manner that tends to reduce the inclination on the part of the user/consumer to "tune out" the advertising content by changing the channel, walking away when the advertising content appears, or simply using the opportunity of the break in the entertainment content to immerse oneself more fully in the distraction provided by the voice-interactive portable personal electronic device.

Exemplary embodiments of the systems and methods according to this disclosure may provide a comparatively cost-effective, entertaining, rewarding, and effective manner by which to deliver advertising content to an audience of users/consumers with a scheme that directly measures user/consumer interaction with the advertising content while collecting information on user/consumers in an unobtrusive, fun and potentially rewarding manner.

Exemplary embodiments may transform advertising from something users/consumers avoid to a drawing card that attracts the attention of the users/consumers in a way that allows the users/consumers to interact with the advertising content in the manner to which they have become accustomed in gathering other information, and making purchases, for example.

In embodiments, the users/consumers may, via voice interaction with their personal electronic devices or otherwise, be presented with an opportunity to review, recall and comment on advertising content in a scheme that rewards attention, including providing an opportunity to win valuable prizes. Objectives of the disclosed schemes are to increase active viewership in the advertising content, advance user/consumer entertainment by making the advertising content less distractive, and promote advertising immersion through willingness on the part of the user/consumer to engage.

These and other features, and advantages, of the disclosed systems and devices are described in, or apparent from, the following detailed description of various exemplary embodiments.

BRIEF DESCRIPTION OF THE DRAWINGS

Various exemplary embodiments of the disclosed original systems, schemes, devices and methods for employing voice-activated user interfaces to determine user attention to particularly-presented content by collecting user contact/consumer information, presenting content to the user, and proposing at least one inquiry or query to the user regarding the presented content, the at least one inquiry or query calling for a user response to be collected, at least one of (a) the user contact/consumer information and (b) the user response to the inquiry or query being collected by the system via a voice-activated user interface, will be described, in detail, with reference to the following drawings, in which.

DETAILED DESCRIPTION OF EMBODIMENTS

The disclosed systems and methods may implement a voice interactive user/consumer reactive and/or transactive scheme in which passive data delivery devices such as, for example, televisions and/or other public or private display screens, deliver content to users/consumers data exchange environment including one or more user/consumer personal portable electronic devices in order to confirm user/consumer attention to the content delivered from the passive data delivery devices. The disclosed schemes may particularly describe a capacity by which user/consumer attention to data content regardless of the delivery medium is measurable. User/consumer attention to the delivered content may be tested via a series of voice delivered content-related questions prompting the user/consumer to provide voice interactive responses.

Embodiments may solve the above-indicated shortfalls in earlier systems and schemes by providing a cost-effective, entertaining, rewarding, and effective way to present advertising content to an audience of users/consumers across a broad spectrum of data delivery devices, including mass media broadcasts and as directed content to a user's/consumer's personal portable electronic devices. Embodiments may thus transform advertising content from something users/consumers typically avoid to a fun, simple user-interactive game that will tend to attract the attention of the users/consumers to the advertising content with an added advantage of presenting users/consumers with an opportunity to be awarded prizes of varying value to stimulate interest. This combination of features may increase user/consumer viewership of the advertising content, user/consumer entertainment, and user/consumer voice interactive advertising immersion. When compared to traditional mass media advertising, exemplary embodiments may deliver advertising content that causes the users/consumers to fully immerse themselves in the advertising content.

Immersion is a heightened attention level that causes the users/consumers to remember the advertising content. Immersion is, in particular, the highest, most effective, and valuable attention level. Immersion helps advertisers achieve a maximized share of the user/consumer attention for advertisers' product presentations. Advertisers' products, and the presentations in which they are displayed, may thus be remembered easier and faster than competing products.

According to the disclosed schemes, user/consumer immersion is enhanced by several methods. First, immersion is enhanced when the advertising content triggers an immediate emotional response within the brain, such as via a warning or alert signal that is deliverable through a voice interactive I/O device. The warning or alert signal may serve to alert the user/consumer to pay more attention to the particularly-presented advertising content and may increase a likelihood that a user/consumer will remember/recall the advertising content when specifically queried.

Second, when users/consumers are afforded an opportunity to interact with the advertising content via the user interactive I/O devices (i.e., in the manner typically employed by the users/consumers), as opposed to passively viewing or hearing the advertising content, the users/consumers may be more likely to remember the advertising content based on a committed level of user/consumer interaction.

According to the current scheme, while engaging the voice interactive techniques and/or processes, users/consumers may have their usage data, engagement behaviors, and content (words, photos, thoughts, and personalities) monitored, collected, analyzed and otherwise used to the benefit of the advertisers, often in a form of presenting "better" or more targeted advertising. User/consumer data may be exchanged (sometimes sold, albeit that such tactics are gaining public disdain), aggregated, and melded, allowing advertisers and other content delivery companies to triangulate portions of supposedly "anonymized" data to a point where individual users/consumers can be virtually personally identified, even to the point of assessing a level of attention to particular advertising content.

Exemplary embodiments may employ particular data protection schemes that may be directed at attempting to ensure that some balance is struck between individual user/consumer privacy concerns and limitations on data sharing with the exigencies of an increasingly animated and competitive retail marketplace. Advertisers may employ the disclosed systems and schemes to make users/consumers comfortable with sharing information in an immersive data exchange environment. Put another way, the disclosed systems and methods seek to ease the tension in the tug-of-war between individual user/consumer privacy and data rights and the capacity of today's data-gathering systems to collect and analyze a catalog of individualized data for use between all constituents (retailers, marketers, advertisers, consumer packaged goods (or CPG) companies, research and analytics companies, and the users/consumers themselves).

In embodiments, a series of queries related to the advertising content may be presented to the user/consumer via one or more "talking" devices, including those in the lists enumerated above, by which the user/consumer may interact with the disclosed systems, devices, schemes and methods. In embodiments, the use of such a series of queries may provide, for example, a form of a memorization request that may tend to increase immersion of the user/consumer in the advertising content by testing an ability of the user/consumer to recall certain specific details of the advertising content. Responding to the audible or visual alert signal may, after time, engender a pseudo-Pavlovian response by the user/consumer to the "alerted" advertising content. Extended exposure to advertising content over time, and/or to a longer effective advertising content length of presentation, may tend to increase the likelihood of the desired advertising content immersion.

The disclosed systems and schemes seek to reduce the intrusive nature, or "feel," of conventional advertising content. An objective is to reduce or effectively eliminate "ad skipping," which has become very commonplace. The disclosed systems and methods may advantageously affect user/consumer behavior by alerting users/consumers to the presence of particularly-presented advertising content via the voice interactive I/O devices more commonly placed in the operating environments of the users/consumers, and rewarding the users/consumers for paying attention, in a measurable manner and according to a reportable scheme, to the advertising content.

The disclosed schemes implement a system by which consumer attention to particular advertising content is measured, while unintrusively collecting demographic and opinion feedback as a part of a new, honest, rewarding, and consumer-centric transactional relationship based on a voice interactive conversation between advertisers and users/consumers initiated in a manner that supplements the provision of passive advertising content to the users/consumers. Instantaneous feedback may be obtained in a manner that does not require, for example, the advertiser to separately "burden" the user/consumer with an emailed survey to ascertain feedback from the user/consumer.

Properly packaged, advertising content is provided via all different forms of media, live (immediate) voice interactive sessions are commenced based on provision of an alert, and a user/consumer immediate response to that alert, user/consumer attention to the advertising content, user/consumer presentation of a series of questions regarding the "just viewed" advertising content, collection of user/consumer responses to the series of questions, and evaluation of those responses to determine user/consumer attention to the advertising content, and to directly or randomly award prizes to various users/consumers based on this simple interaction.

While there are many online firms that have, with varying degrees of success, attempted to merge some behavioral data with transaction data, it is postulated that the type of interaction proposed here will easily eclipse those efforts by providing a much more user/consumer interactive "friendly" exchange with the possibility of prizes being awarded at the end. In this regard, earlier such efforts, which may have proven only limitedly successful by maintaining an impersonal relationship between the retailers, and their vendor partners, and the consuming population that they are attempting to address, some would say manipulate, may be overshadowed by these simpler, more user/consumer friendly methods.

The disclosed schemes attempt to better harness the tremendous capabilities of the data aggregation companies or data aggregators, which are currently unable to fully exploit their massive databases of transactional information, due to: a) their lack of ownership of census-level demographic information; and b) competitive concerns on the part of their merchant partners. A key to value and long-term viability for the data aggregators as service providers is to develop relationships with the agencies, and more importantly, the body of users/consumers—not just with a partial panel or subset of existing transactions.

The challenge is to bring a new value to the retailers, and exchange this new value for access to the user/consumer information, and the right to leverage that information in a manner that provides value back to the user/consumer in a trusted environment. In exchange for better service for the users/consumers, access to consumers' transactions may be provided in a non-threatening and trusted manner. In this endeavor, a challenge exists in finding new uses for existing hardware and distribution channels, particularly where efforts may be directed at accessing the technology deployed by others (such as mobile phone service providers or social network infrastructures) to complement existing services and hardware deployment, this is particularly true in the disclosed capacity to leverage the latest voice interactive technologies in a manner that makes the users/consumers comfortable with the level of data exchange they are providing ultimately to the data aggregators and the retailers at large.

Figure 1:
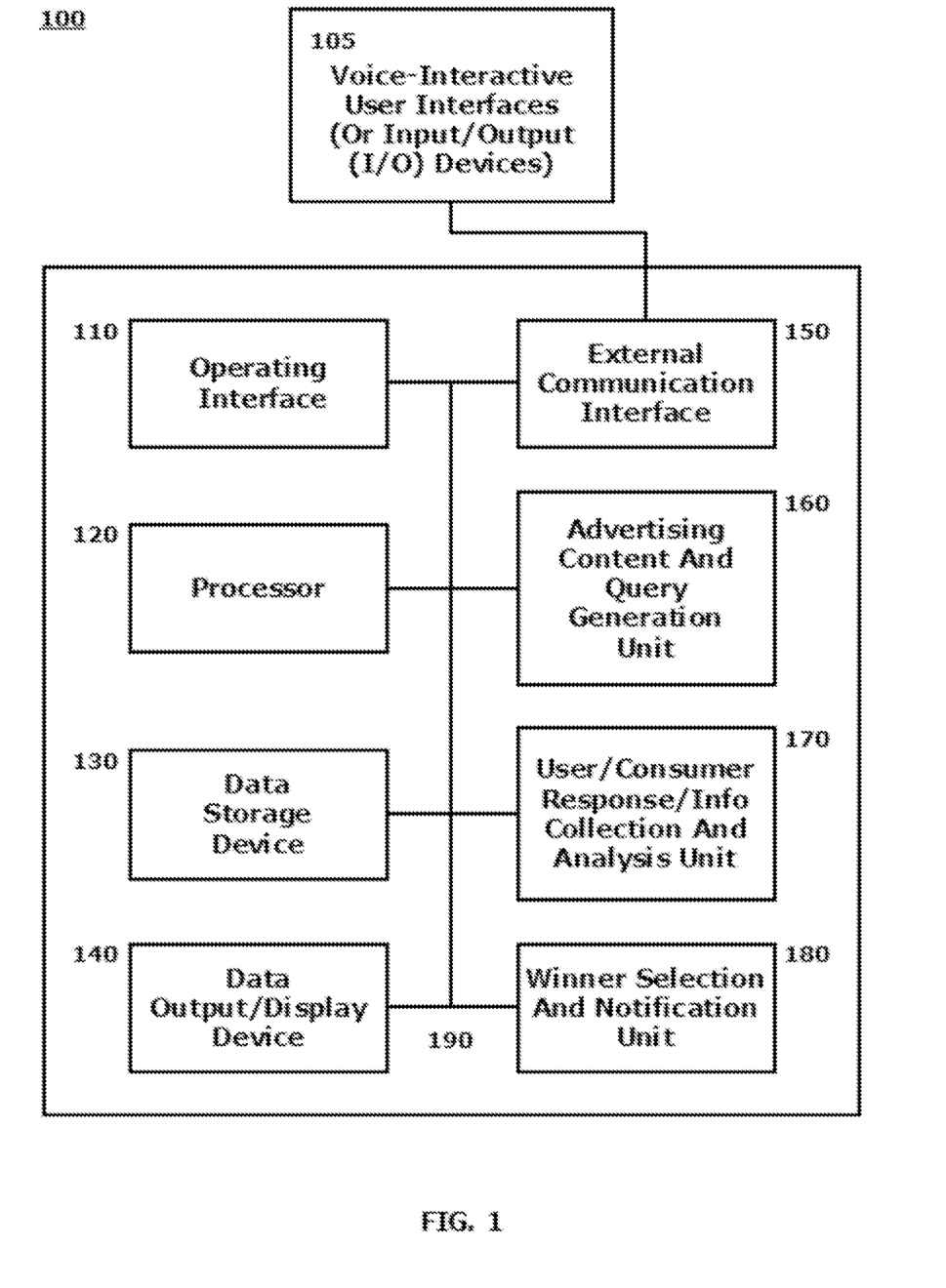
FIG. 1 illustrates a block diagram of an exemplary system for implementing voice-interactive user interface data exchange according to the varied schemes outlined in detail below in this disclosure.

FIG. 1 illustrates a block diagram of an exemplary system 100 for implementing voice-interactive user interface data exchange according to the varied schemes outlined in detail below in this disclosure.

The exemplary system 100 may include an operating interface 110 by which a host or administrator may communicate with the exemplary system 100. The operating interface 110 may provide the host or administrator an opportunity to initiate the automated advertising content presentation scheme, and to input any parameters appropriate to the conduct and/or control of the user/consumer interactions according to the disclosed schemes outlined above and described in more detail below, including any parameters for collection and/or aggregation user/consumer information, including responses to queries received from a plurality of users/consumers via individual voice-interactive user interfaces (or input/output (I/O) devices) 105. Measured user/consumer interaction may be received from a plurality of individual voice-interactive user interfaces 105 via, for example, an external communication interface 150.

It should be noted that the user/consumer voice-interactive user interfaces 105 may be any personal electronic device employed by a user/consumer, which includes voice-interactive input output capability whereby the user/consumer may be alerted to pending advertising content to which the user's/consumer's attention may be directed, view presented advertising content on a display screen, be presented with certain questions, inquiries or queries regarding the presented advertising content, and via the voice-interactive user interface 105, provide certain responses to the questions, inquiries or queries.

The operating interface 110 may be configured as one or more conventional mechanisms common to computing and/or communication devices that may permit the host or administrator to input information to the exemplary system 100. The operating interface 110 may include, for example, a conventional keyboard, a touchscreen with "soft" buttons or with various components for use with a compatible stylus, a microphone by which the host may provide oral commands to the exemplary system 100 to be "translated" by a voice recognition program, or other like device, including any emerging wearable I/O device, by which a user may communicate specific operating instructions and pre-determined parameters setting to the exemplary system 100.

The exemplary system 100 may include one or more local processors 120 for individually operating the exemplary system 100 and for carrying into effect the disclosed schemes in the exemplary system 100. The processor 120 may carry out routines appropriate to operation of the exemplary system 100, and may undertake data manipulation and analysis functions appropriate to the implementation of the scheme of advertising content alert, advertising content display, user/consumer information and/or response collection and user/consumer audience attention metrics according to the disclosed schemes. Processor(s) 120 may include at least one conventional processor or microprocessor that interprets and executes instructions to direct specific functioning of the exemplary system 100, and control of the automated schemes in any of the disclosed variations.

The exemplary system 100 may include one or more data storage devices 130. Such data storage device(s) 130 may be used to store data, including collected user/consumer data, or operating programs to be used by the exemplary system 100, and specifically the processor(s) 120 in carrying into effect the various schemes. At least one of the data storage device(s) 130 may be used to store the user/consumer identification and demographic data, and/or measured advertising attention metrics, as received from the plurality of voice-interactive user interfaces 105, such data being usable to identify individual user/consumer advertising preferences, priorities, and/or accessibility to the disclosed schemes implemented by the exemplary system 100 according to use of a particular voice-interactive user interface 105.

The data storage device(s) 130 may include a random access memory (RAM) or another type of dynamic storage device that is capable of storing updatable database information, and for separately storing instructions for execution of system operations by, for example, processor(s) 120. Data storage device(s) 130 may also include a read-only memory (ROM), which may include a conventional ROM device or another type of static storage device that stores static information and instructions for processor(s) 120. Further, the data storage device(s) 120 may be integral to the exemplary system 100, or may be provided external to, and in wired or wireless communication with, the exemplary system 100, including as cloud-based storage components.

The exemplary system 100 may include at least one data output/display device 140, which may be configured as one or more conventional mechanisms that output information to a user/consumer, or locally to the host or administrator, on a progress of the individual user's/consumer's interaction with the system via a voice-interactive user interface 105, and/or the conduct of the advertising content display and data collection scheme implemented by the exemplary system 100. The data output/display device 140 may be used to indicate to the host or administrator information regarding a compilation of the data received from the plurality of user/consumer voice-interactive user interfaces 105, as well as a progress of the advertising content and quiz/query scheme associated with a linear television or streaming broadcast, for example. It is not necessary that the host or administrator monitor the actual conduct of the automated scheme executed by the exemplary system 100, but the host or administrator is afforded that option via one or more data output/display device(s) 140. Further, the data output/display device 140 may be in the form of a printer or other data delivery means by which, for example, reports may be generated to be later reviewed by the host or administrator.

The exemplary system 100 may include one or more separate external communication interfaces 150 by which the exemplary system 100 may communicate with one or more of a plurality of user/consumer voice-interactive user-interfaces 105 via which a user/consumer may choose to engage with exemplary system 100 executing the scheme by which, for example, advertising content is presented to the user/consumer, questions/inquiries/queries regarding the advertising content are then presented to the user/consumer and responses to the presented question/inquiries/queries are collected from the user's/consumers via their voice-interactive user interfaces 105. Communication between the external communication interface 150 and the one or more of the plurality of the voice-interactive user interfaces 105 will typically be via wireless communication with the exemplary system 100, but this need not necessarily be the case where, for example, a particular local headset as a voice-interactive user interface 105 may be plugged into an exemplary system 100. It is anticipated that components of the exemplary system 100 may communicate with a broad spectrum of boys seven interactive user interfaces 105 that may generally be employed by each user/consumer in executing engagement with the scheme implemented by the exemplary system 100.

The exemplary system 100 may include an advertising content and query generation unit 160 that may be used to generate and/or propagate the advertising content, and to coincidentally generate and forward questions/inquiries/queries related to presented advertising content with which the question/inquiries/queries may be associated in implementing the scheme according to this disclosure. As indicated below, the question/inquiries/queries may be drawn from a database stored in one or more the data storage devices 130.

The exemplary system 100 may include a user/consumer response/info collection and analysis unit 170 that may be used to collect and aggregate user/consumer information presented to the exemplary system 100 by the users/consumers via their voice-interactive user interfaces 105. The user/consumer response less info collection and analysis unit may be usable to analyze, and/or otherwise score user/consumer responses to the presented question/inquiries/queries related to the presented advertising content as received from the plurality of voice-interactive user interfaces 105. It should be noted that either or both of the advertising content and query generation unit 160, and the user/consumer response/info collection and analysis unit 170 may themselves be functions of the processor 120, or may exist in the exemplary system 100 as stand-alone components.

The exemplary system 100 may include a winner selection and notification unit 180 by which, when a particular user/consumer participating in engagement with the scheme implemented by the exemplary system 100 by communicating responses to individual questions/inquiries/queries, and certain identifying information for the user/consumer, is determined to have been enough to trigger the winning of a prize, award, reward or the like, according to a pre-determined scheme, the prize, award, reward or the like being in a form of, for example, merchandise, discounts, coupons, cash and/or other incentives, that selection may occur based on an aggregated score for the "correctness" of responses to those questions/inquiries/queries related to the advertising content received from the user/consumer response/info collection and analysis unit 170 at which time the user/consumer may be immediately notified by having a particular message formatted by the winner selection and notification unit 180 and transmitted to the one of the plurality of voice-interactive user interfaces 105 controlled by the particular user/consumer via the external communication interface 150. Like the advertising content and query generation unit 160, and the user/consumer response/info collection and analysis unit 170, the winner selection and notification unit 180 may be a function of the processor 120, or a stand-alone device within the exemplary system 100.

The exemplary system 100 may communicate with one or more of a plurality of voice-interactive user interfaces 105, each of which may itself include a separate user interface, processor, communication interface, memory, and display device. The user/consumer as an actor or a player participant in the disclosed scheme implemented by the exemplary system 100 may employ her or his voice-interactive user interface 105 for interaction with the exemplary system 100 as it carries into effect the disclosed schemes for implementing the advertising content display and user/consumer information interaction. It should be noted that one or more of the plurality of voice-interactive user interfaces 105 by which a user/consumer may interact with the exemplary system 100 may be any one of the many portable personal electronic devices catalogued above, and user-wearable I/O and/or computing devices such as, for example, wearable computer/communicating display glasses and/or watches, virtual reality (or immersion) devices including goggles or helmets, and other known or developed wearable components for carrying out one or more of computing and/or communicating functions allowing user to communicate with the exemplary system 100 via voice-interactive means.

All of the various components of the exemplary system 100, as depicted in FIG. 1, may be connected internally, and to one or more external components by one or more data/control busses 190. These data/control busses 190 may provide wired or wireless communication between the various components of the exemplary system 100, whether all of the components of the exemplary system 100 are housed integrally in, or are otherwise external and connected to the exemplary system 100.

It should be appreciated that, although depicted in FIG. 1 as an essentially integral unit, the various disclosed elements of the exemplary system 100 may be arranged in any combination of sub-systems as individual components or combinations of components, integral to a single unit, or external to, and in wired or wireless communication with the single unit of the exemplary system 100. Wireless communications may be by RF radio devices, optical interfaces, NFC devices and other wireless communicating devices according to RF, Wi-Fi, WiGig and other like communications protocols. In other words, no specific configuration as an integral unit, or as a support unit, is to be implied by the depiction in FIG. 1. Further, although depicted as individual units for ease of understanding of the details provided in this disclosure regarding the exemplary interface and control system 100, it should be understood that the described functions of any of the individually-depicted components may be undertaken, for example, by one or more processors 120 connected to, and in communication with, one or more data storage device(s) 130.

Figure 2:
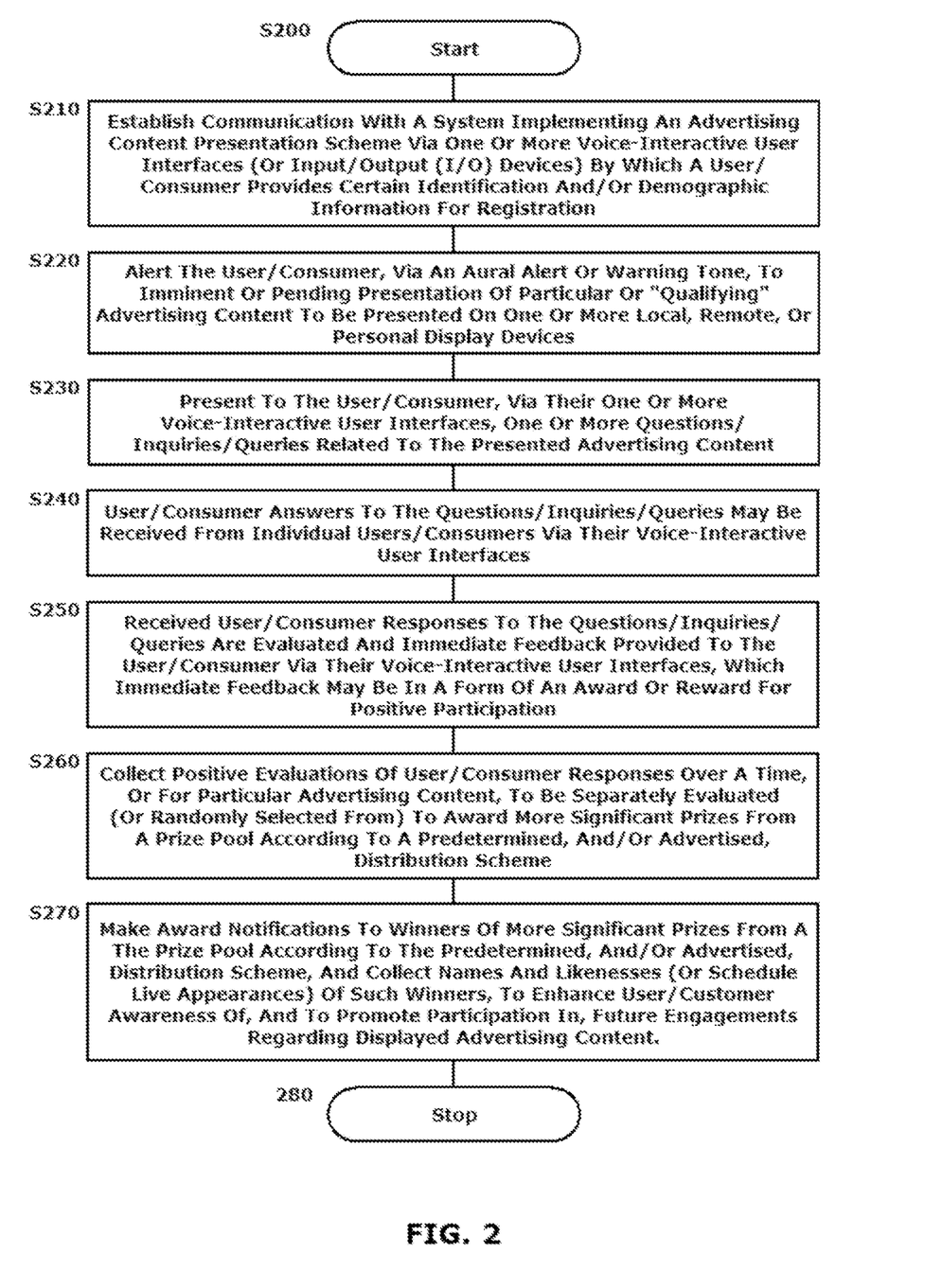
FIG. 2 illustrates a flowchart of an exemplary method for implementing voice-interactive user interface data exchange scheme according to this disclosure.

FIG. 2 illustrates a flowchart of an exemplary method for implementing voice-interactive user interface data exchange scheme according to this disclosure. Operation of the method commences at Step S200 and proceeds to Step S210.

In Step S210, communication may be established with the system implementing an advertising content presentation scheme. This disclosure uniquely contemplates that such communication will be established via one or more voice-interactive user interfaces (or input/output (I/O) devices) by which a user/consumer may provide certain identification and/or demographic information for registration and essentially be placed in a passive or stand-by mode of the scheme. Operation of the method proceeds to Step S220.

In Step S220, the user/consumer may be alerted to the imminent or pending particular presentation of advertising content via an audible alert or warning provided through the user's/consumer's at least one voice-interactive user interface. In embodiments, the user/consumer may be afforded a limited amount of time to arrange to receive the presentation of the advertising content passively or actively. The advertising content may be displayed in a manner that is easily accessible to the user/consumer. Such display may be on television, via radio, via some digital display screen in any public venue (including airport concourses, or the myriad display screens typical at any public sporting event). Operation the method proceeds to Step S230.

In Step S230, at an appropriately calculated time following the presentation/display of the advertising content, pre-registered users/consumers may be presented with a series of questions/inquiries/queries, particularly via voice-interactive user interfaces associated with any one or more of the users/consumers, including via their personal and/or portable electronic devices. These voice interactive question/inquiries/queries may quiz the individual user/consumer regarding particular details of the recently-presented advertising content, optionally supplemented with questions/inquiries/queries that quiz the user/consumer regarding details of the surrounding programming content. Operation of the method proceeds to Step S240.

In Step S240, user/consumer answers or responses to the question/inquiries/queries may be received from the pre-registered users/consumers via their voice-interactive user interfaces. In embodiments, the user/consumer may be provided a particular response time within which to respond to the question/inquiries/queries in order that the user/consumer responses are only informed by the particular details of the most recently presented and viewed advertising content. Operation of the method proceeds to Step S250.

In Step S250, received user/consumer responses may be evaluated and immediate feedback provided to the user/consumer. The immediate feedback may be a positive evaluation of the user/consumer responses, and may result in distribution of a form of some type of awards/reward for user/consumer participation. Operation of the method proceeds to Step S260.

In Step S260, all positive evaluations of user/consumer responses over a particular period of time, or with respect to particularly-presented advertising content, may be collected and separately evaluated, or randomly selected from, to award more significant prizes from a prize pool according to a predetermined, and/or advertised, distribution scheme. Operation of the method proceeds to Step S270.

In Step S270, winners of more significant prizes from the prize pool according to the predetermined, and/or advertise, distribution scheme may be notified. In embodiments, the names, likenesses, and/or live appearances of such winners of more significant prizes may be collected for later use to enhance user/customer awareness of, and participation in, future engagements regarding displayed advertising content. Operation of the method proceeds to Step S280, where operation of the method ceases.

The above-indicated alert-attention-interactive response-analysis-awards/reward scheme may be particularly advantageously undertaken with emerging voice interactive I/O device technologies. The scheme may also provide a manner by which to collect, analyze and evaluate additional demographic and/or user/consumer habit information regarding particular attention to individualized advertising content by time, by region, by content, by device, or otherwise.

Currently, there are sound sensing applications that, when opened, can listen for embedded inaudible audio watermarks or segments of songs that then are searched against a database to reveal the name of a song, or to open a website, for example. The disclosed schemes, when opened by a pre-registered user/consumer, may employ all measure of the currently-available voice interactive I/O devices and/or third party listening techniques, to passively listen for audible (or inaudible) commands within spoken, perceived, or other media content picked up by the voice interactive I/O devices in a particular listening environment, including, for example, in the vehicle of a user/consumer. Retrievable audio inputs may then be translated, and a particular scheme of questions/inquiries/queries may be launched based on that collected information in a hands-free user/consumer operating environment. Such a capability may enable, for example, a vehicle driver to react without significant effect on his or her driving attention, or people without ability or desire to avert their eyes or hands to react, to engage in a hands-free, voice interactive environment.

The use of voice interactive I/O devices associated with an operating environment, or the personal electronic devices, of a particular user/consumer provide a gateway to an information collection and storage system that may be proprietary to a particular advertiser, or that may otherwise include numerous service providers providing data exchange with the user/consumer. The information collection and storage system may be usable to collect, parse, analyze and store data gathered ultimately from the voice interactive I/O devices employed by individual users/consumers. The stored data may be parsed appropriately into individual identifying data for each user/consumer and overall user/consumer population data. The individual identifying data for each user/consumer may be randomly updated to include user/consumer registration information, response information, interaction information, random winner selection information and other related information usable to particularly identify, target, and interact with individual users/consumers.

The information collection and storage system is intended to provide a secure repository for all user/consumer individual identifying information, which may include, but not be limited to, personal information, which may include the name, address, social security number (which is typically obtained only from prize winners for tax reporting purposes), personal ID numbers, phone number, identification of the devices (including the voice interactive I/O devices) employed by the identified user/consumer and other collectible information regarding, for example, the particular "shopping" or advertising content interaction, habits of the identified user/consumer.

The information collection and data storage system may include a capacity by which to determine effectiveness of advertising content, particular sets of user/consumer queries, accuracy of responses, and other information that may be usable to advertisers and/or content providers in modifying the advertising, or other, content provided to the users/consumers to be most effective in its delivery.

In embodiments, a pre-registration process may be advertised by conventional means to generate initial interest in the deployment of the particular advertising content according to the outlined schemes, and for which alerts may be provided to pre-registered users/consumers. Particular user/consumer data may be collected and stored in a database associated with the information collection and data storage schemes outlined above. As the concept catches on publicly, and is itself advertised for its benefits, it is believed that interest in the disclosed schemes by advertisers and users/consumers alike will increase as each clamors to take advantage of the tangible and intangible rewards provided by the disclosed schemes.

Individual displays of advertising content may then be prefaced by alert indications and/or tones, or pre-advertising according to a recognizable mark, that signal immediate, imminent, pending and/or future attention to particularly-presented advertising content to be displayed and reacted to.

The advertising content may then be displayed on all manner of display devices, as described above or otherwise, immediately after the alert indications, or according to a schedule provided in association with the alert indications. The employment of voice-interactive user interfaces is intended to render the disclosed schemes fairly immediate in the interaction with users/consumers. This does not, however, preclude scheduling future user/consumer interactive sessions in which "conversations" may be had with the disclosed systems generally in the manner described throughout.

In all cases, it will be up to the user/consumer to determine whether or not to "participate" in a particular advertising event. When participating, the user/consumer may actively indicate participation in the particular advertising event by, for example, providing some indication to the system that the user/consumer is participating. Otherwise, a first indication of participation in a particular advertising event may be when a first response to a particular question/inquiry/query in the set of questions/inquiries/questions presented after the advertising content is displayed is received from the user/consumer via a voice-interactive user interface associated with the user/consumer.

Regardless of the manner in which the system is alerted to participation by a particular user/consumer, evaluation of the answers provided by the user/consumer to the one or more questions/inquiry/queries may be undertaken for any evaluation purpose. According to a specified scheme, prizes may be awarded directly or randomly to incentivize the current and future participation of an anticipatedly increasing population of users/consumers responding via voice interactive user interfaces.

One can anticipate that the entities supporting various voice interactive user interfaces may have a vested interest in determining participation via their proprietary user I/O devices and schemes and may modify their approaches as well to capture a greater percentage share of the participating user/consumer population.

In embodiments, the disclosed information collection and storage schemes may accommodate multiple variables in their information, data collection and data analysis activities. Accounting may be had for anticipated traffic and geographic/time zone requirements. Differing data collection and storage restrictions attributable to differing domestic and international jurisdictions may be accounted for, and accommodated, as well.

In embodiments, selection criteria for winners of awards/rewards, and distribution of prizes/prize pools, may typically be reserved to the providers of the advertising content. It is envisioned that the voice-interactive user interface service providers may work independently, or in concert with the advertising content providers, to establish schemes to further incentivize use of their particular products.

The advertising content provider, the involved voice-interactive user interface service provider, or a third party service provider (in the context of an offer fulfillment services provider, for example), may add a step of contacting potential (or contingent) winners to verify identities of, and/or the truthfulness of a potential (or contingent) winner's registration and response information. If this option is used, the involved provider may verify the identity by authenticating the registration and response information of the user/consumer identified or selected as the potential (or contingent) winner. The involved provider may require potential (or contingent) winners to verify demographic or confidential data prior to awarding prizes. For example, a provider may repeat one or more of the questions/inquiries/queries, and may elect to disqualify potential (or contingent) winners who fail to provide responses that match previous responses.

In other embodiments, a user/consumer may open a listening and engagement application on a mobile device carried by the user/consumer when entering their vehicle, for example. The radio station selected by the user/consumer on the vehicle audio/entertainment system may provide the medium for the passive delivery of the advertising content to which the user/consumer may be alerted as the user/consumer drives her or his car with a robust automated and interactive implementation of the disclosed schemes.

When the user/consumer, as a driver or passenger in the vehicle, is alerted by an aural tone that particularly-presented advertising content (individually or in a pod of multiple ads) is presented, the user/consumer may pay attention to the passively delivered advertising content insofar as she or he would to any other entertainment or advertising content delivered via the vehicle audio/entertainment system.

At a completion of the presentation of the tone-alerted advertising content passively through the vehicle audio/entertainment system, an initial question/inquiry/query may be presented that asks, for example, as to whether the user/consumer desires to proceed with voice engagement with the system (e.g., the advertising content, or a moderator, may provide an additional alert to the user/consumer in a form of a question or statement such as "React Now to Code 3578").

In such an embodiment, a scheme (or application) on the mobile device of the user/consumer may be triggered by a phrase such as "React Now," and respond by issuing an inquiry to the user/consumer, via the "connected" vehicle audio/entertainment system, such as "Do you want to React to Code 3578?" The user/consumer may signal a desire for further action by simply responding "YES" via a voice-interactive user-interface.

In such a circumstance, a robust implementation of the disclosed schemes may lower the volume on the vehicle audio/entertainment system, and may then present the questions/inquiries/queries related to the advertising content via the "connected" vehicle audio/entertainment system. The driver, as the involved user/consumer, is then afforded the opportunity to keep her or his "eyes on the road," while engaging with the series of questions/inquiries/queries. At the conclusion of such an engagement session, the scheme or application may return the settings (volume) on the "connected" vehicle audio/entertainment system back to their original levels and continue to monitor for subsequent targeted advertising engagement experiences.

As to integration between a mobile device and/or application implementing the disclosed schemes, and a vehicle audio/entertainment system with which the mobile device may be connected while in the vehicle, the scheme or application may be enabled to use the vehicle's audio/entertainment system and microphone, and override the microphone and speaker of the mobile device carried by the user/consumer while "connected."

In embodiments, the vehicle audio/entertainment system may also append and transmit the responses along with other collectible user/consumer information, including a radio station ID, a GPS location, and/or a time stamp for cataloging by the host or administrator network information collection and storage scheme in the manner described above.

In any of the above embodiments in which a radio network may provide the medium for the passive delivery of entertainment and advertising content contemplated by this disclosure, implementations may include certain standard or enhanced features that may allow the radio network to use the disclosed systems and schemes, while affording the system provider the opportunity to defend the system, and to protect the system from being undermined and/or ultimately rendered useless by, for example, malicious actors.

In embodiments, an initial alert, in a form of a tone or catch phrase, such as, for example, "It's React Break 3456—get ready to Listen, React and Win," or other endorsed phrase or portion thereof, may be provided at the start of a segment of particularly-presented advertising content. The phrase, when used, may serve multiple purposes. First, the phrase may serve to alert to the user/consumer to what follows being particularly-presented advertising content according to the disclosed schemes. Second, the phrase may serve as a notification to a system-hosted application to commence verifying the interrupted passive content network broadcast. Such an application may then continue to monitor the stream of audio to provide verification that, for example, supported advertising content was not substituted nor skipped once the user/consumer is alerted by the phrase to pay particular attention to the particularly-presented advertising content according to the disclosed schemes. The monitoring may also ascertain status of a "connected" voice interactive or passive entertainment system, and actions taken in response to the phrase including whether the audio system volume was lowered, or the channel/station was changed. The system application may do so by listening for audible sections of the advertising content to follow, or for inaudible watermarks embedded in advertising content using known techniques. At a conclusion of the particularly-presented advertising content, "React Code," or some other identifier that would link the question/inquiry/queries that follow to the specific content previously broadcast, may be presented (spoken or otherwise broadcast in a manner not audible to the user/consumer, but only to the system application), commencing the reactive IVR session with the user/consumer (e.g., "Would you like to React Now to React Code 3548?").

In embodiments, should the user/consumer complete the immersion experience, in addition to the question/inquiry/query responses and other data to be shared, validation as to a portion or percentage of the advertising content to which the system application "recorded" the user/consumer as potentially being exposed may also be shared. Such an option may provide the broadcast network, radio network or other media outlet with evidence of exposure and time of impression statistics on par with online video, an advantageous enhancement in the radio broadcast and/or podcast environments. The amount of exposure and time of impression data may be utilized to ensure that prize awards are allocated to users who have achieved at least a minimum required quantity of exposure, and may also be used as the basis for a standalone reward system tied to verified periods of exposure.

The above-indicated capabilities embedded in a system or system application implementing the disclosed schemes may serve to undermine the efforts of third party (or rogue) actors, advertisers and/or networks seeking to undermine the disclosed voice interactive and reactive radio schemes and/or methods, by using, or essentially hijacking, the same alerts or application trigger phrases in their non-associated presentations of advertising content or broadcasts. In embodiments, properly-enabled advertising content may include unique human inaudible watermarks that validate the authenticity of the particularly-presented advertising content benefiting from immersion verification. In the above example, should the alert be "It's a React Break . . . ," an underlying unique human inaudible watermark may be embedded in the passive radio broadcast frequency, or separately in the advertising content itself, such that the presence of both the alert and authentication signal may be verified as required elements to commence a stream monitoring process, and/or to enable the reactive queries at the conclusion of the presentation of the advertising content. Alternatively, a unique spoken React Code could be presented at the moment of alert, which the system and/or system application may use to authenticate the legitimacy of the purported reactive advertising content.

Although the above description may contain specific details, these details should be construed as illustrative and not construed as limiting the disclosure in any way. Other configurations of the described embodiments may be part of the scope of the disclosed embodiments. For example, the principles of the disclosed embodiments may be applied to each individual user/consumer that may independently access features of the disclosed voice interactive data exchange, verification and reward systems and/or schemes. This enables each user/consumer to utilize the benefits of the disclosed embodiments even if any one of a large number of possible applications do not need all of the described functionality. In other words, there may be multiple instances of the disclosed systems, methods, devices and schemes each being separately employed in various possible ways at the same time where the actions of one user do not necessarily affect actions of other users using separate/discrete embodiments.

I claim:

1. A system for implementing an interactive scheme to monitor user engagement with media content, comprising:
   a display device that is configured to display broadcast media content;
   a communication interface that is configured to establish a communication link with a plurality of voice-interactive user interfaces;
   a data collection and analysis device that is configured to receive and collect user inputs from a plurality of users input via the plurality of voice-interactive user interfaces across the established communication link; and
   a question providing device that is configured to generate questions associated with the displayed broadcast media content, wherein:
   the question providing device is further configured to provide at least one question associated with the displayed broadcast media content to the plurality of users by at least one of (a) displaying the at least one question on the display device and (b) communicating the at least one question via the plurality of voice-interactive user interfaces, and
   the data collection and analysis device is further configured to:
   (a) determine which of a plurality of received user inputs represents an answer to the at least one question;
   (b) evaluate whether a determined answer to the at least one question reflects association with the displayed broadcast media content;
   (c) aggregate an evaluation of a plurality of determined answers to a plurality of the at least one questions to produce an objective evaluation of attention of each of the plurality of users to the broadcast media content;
   (d) generate messages to be communicated to the plurality of users via the communication link regarding a result of the objective evaluation;
   (e) communicate the generated messages to the plurality of users as at least one of (a) a separate display on the display device or (b) another input via the plurality of voice-interactive user interfaces;
   (f) notify a particular user that exceeds a predetermined threshold of the aggregation of a particular award based on the aggregation;
   (g) assess and store a comparative analysis of the attention to the broadcast media content by comparing aggregations for the plurality of users;
   (h) apply a predetermined criteria to the comparative analysis for the plurality of users to identify one or more of the plurality of users as winners of one or more predetermined prizes; and
   (i) communicate to the winners of the one or more predetermined prizes a separate message via the one or more of the plurality voice-interactive user interface of each of the one or more of the plurality of users identified as the winners instructions for obtaining the one or more predetermined prizes in a form of at least one of merchandise, discounts, coupons or cash; and
   an audible alert is communicated to the plurality of voice-interactive user interfaces of the plurality of users prior to display of the broadcast media content on the display device.

* * * * *